United States Patent [19]
Brehm et al.

[11] Patent Number: 5,717,808
[45] Date of Patent: Feb. 10, 1998

[54] METHOD OF APPLYING AN AMORPHOUS BORON-BASED PROTECTIVE COATING TO AN OPTICAL FIBER, AND AN OPTICAL FIBER INCLUDING SUCH A COATING

[75] Inventors: Claude Brehm, Montrouge; Lionel Vandenbulcke, Saint Jean le Blanc; Jean-Yves Boniort, Limours; Bruno Lavigne, Antony, all of France

[73] Assignee: Alcatel Fibres Optiques, Bezons Cedex, France

[21] Appl. No.: 632,414

[22] PCT Filed: Aug. 23, 1995

[86] PCT No.: PCT/FR95/01107

§ 371 Date: Apr. 24, 1996

§ 102(e) Date: Apr. 24, 1996

[87] PCT Pub. No.: WO96/06055

PCT Pub. Date: Feb. 29, 1996

[30] Foreign Application Priority Data

Aug. 25, 1994 [FR] France .................... 94 10283

[51] Int. Cl.⁶ .................................................. G02B 6/02
[52] U.S. Cl. ...................... 385/128; 385/123; 65/60.1; 428/366
[58] Field of Search ...................... 385/128, 123–127; 65/60.1, 430, 382, 381; 428/366

[56] References Cited

U.S. PATENT DOCUMENTS

| 4,319,803 | 3/1982 | Burmeister et al. | 350/46.33 |
| 4,735,856 | 4/1988 | Schultz et al. | 385/128 X |
| 5,246,746 | 9/1993 | Michalske et al. | 427/593 |

FOREIGN PATENT DOCUMENTS

| 0149323A2 | 7/1985 | European Pat. Off. |
| WO8201543 | 5/1982 | WIPO |
| WO8705831 | 10/1987 | WIPO |

*Primary Examiner*—Phan T. H. Palmer
*Attorney, Agent, or Firm*—Sughrue, Mion, Zinn, Macpeak & Seas, PLLC

[57] ABSTRACT

A method of applying an amorphous boron-based protective coating to an optical fiber comprising an optical core enclosed in optical cladding, both made of a silica-based material, wherein the boron is applied to the surface of said optical fiber chemically from the vapor phase at a temperature lying in the range 1050° C. to 1250° C., by reducing boron chloride $BCl_3$ by means of hydrogen $H_2$. The amorphous boron protective coating imparts mechanical protection to the fiber, and enhanced abrasion resistance, enabling the fiber to be used in optical cables of high capacity and that are highly compact. The thickness of the resin coating can be about half that required when a carbon protective coating is used, and can even be eliminated. The coating further provides sealing properties comparable to those provided by a carbon coating.

11 Claims, 1 Drawing Sheet

5,717,808

METHOD OF APPLYING AN AMORPHOUS BORON-BASED PROTECTIVE COATING TO AN OPTICAL FIBER, AND AN OPTICAL FIBER INCLUDING SUCH A COATING

The present invention relates to a method of applying an amorphous boron-based protective coating to an optical fiber, and to an optical fiber including such a coating.

BACKGROUND OF THE INVENTION

The conventional structure of an optical fiber is well-known: an optical fiber comprises an optical core, for guiding the majority of the light waves, enclosed in optical cladding, the core and the cladding both being constituted by a silica-based material which is doped to a greater or lesser extent in the core and cladding zones. "Optical cladding" is defined here in a broad sense, i.e. the optical cladding comprises all the silica-based layers which surround the core, regardless of the method by which they have been obtained.

In certain known optical fibers, the optical cladding is directly covered by a resin coating, designed to avoid in part the consequences of the microbends suffered by the fiber, in particular while it is being installed in a cable. During installation and use, the optical fiber is subjected to bending and traction stresses which lead in the long term to mechanical fatigue, i.e. to deterioration of its mechanical properties which consequently results in deterioration of its transmission performance.

In other known optical fibers, designed mainly to be used in moist environments (in particular in underwater applications) where the optical fiber is subjected to the action of water and hydroxyl ions OH--, a protective coating is disposed directly on the optical cladding, under the resin coating. When the optical fiber is subjected to stresses which lead to mechanical fatigue and consequently provoke microcracks in its surface, attack by moisture or by OH⁻ ions cause the microcracks in its surface to grow, which weakens the fiber, causing it to break.

In known manner, the protective coating provided on said fibers is generally constituted by carbon that is non-crystalline or turbostratic (i.e. having a structure that causes it to provide much better sealing than does graphite carbon) which carbon is deposited on the optical fiber chemically from the vapor phase, for example.

However, such a carbon protective coating is not entirely satisfactory: although it provides sufficient sealing for the fiber, it presents poor resistance to abrasion because it is not hard enough. It does not therefore protect the fiber in the long term against abrasion due to rubbing against other fibers when a plurality of fibers are installed in a cable, or due to rubbing against the inside wall of the cable in which it is installed. Unfortunately, abrasion causes microcracks to appear in the surface of the fiber, which leads to the risk of the fiber breaking.

To avoid abrasion of the fiber, the resin coating of the fiber must be very thick, in practice, not less than 60 µm thick. Unfortunately, this is very detrimental when, as in the current case, it is desired to increase the capacity of optical fiber cables, so that they can contain up to 50 to 100 optical fibers. Thus a very thick resin coating prevents the cable being compact, with compactness being necessary to enable cables to be used in applications where very little space is available.

U.S. Pat. No. 4,319,803 proposes providing a protective coating made of various materials, including amorphous boron, which coating is supposed to enable the above-mentioned drawbacks to be eliminated.

However, that patent does not propose any method of applying said amorphous boron protective coating to the optical fiber.

OBJECT AND SUMMARY OF THE INVENTION

The object of the present invention is therefore to provide a method of applying an amorphous boron-based protective coating to an optical fiber.

To this end, the invention proposes a method of applying an amorphous boron-based protective coating to an optical fiber comprising an optical core enclosed in optical cladding, both made of a silica-based material, wherein the boron is applied to the surface of said optical fiber chemically from the vapor phase at a temperature lying in the range 1050° C. to 1250° C., by reducing boron chloride $BCl_3$ by means of hydrogen $H_2$.

In quite remarkable manner, it has been observed that, for temperatures lying in the range 1050° C. to 1250° C., the reduction of $BCl_3$ by $H_2$ is accompanied by limited solid phase interaction between the resulting boron and the silica $SiO_2$ of the fiber, which leads to good adherence of the deposited boron layer, whereas:

at lower temperatures, interaction is observed between the gaseous phase containing the boron chloride and the solid silica surface, which leads to high corrosion of the surface of the fiber and to very poor adherence between the amorphous boron layer and the fiber; and at higher temperatures, solid phase interaction between the boron and the silica is very great, leading to a very thick layer of boron oxide $B_2O_3$ forming on the surface.

The present invention is therefore based on the above-mentioned remarkable observations which have enabled a range of temperatures to be defined in which limited interaction exists between the boron and the silica, which causes only a very thin interaction layer to form between the boron and the silica, enhancing adherence of the amorphous boron layer to the fiber.

In addition, also in quite remarkable manner, it has been observed that the amorphous boron layer thus deposited is much harder than a layer of amorphous boron deposited on a substrate which is inert relative to boron, i.e. which does not react with the boron, unlike silica. Thus the Vickers hardness of amorphous boron on an inert substrate lies in the range 3000 kg/mm² to 4000 kg/mm², whereas that of boron deposited in accordance with the invention on a silica fiber lies in the range 4700 kg/mm² to 7800 kg/mm² (as an indication, the Vickers hardness of natural diamond is 9000 kg/mm²). This is due to the fact that at temperatures lying in the range 1050° C. to 1250° C., interaction between boron and silica, although limited, is quite beneficial because in quite unexpected manner it causes the amorphous boron layer to be doped by silicon coming from the silica. It is this phenomenon which seems to be at the origin of the very great hardness of the deposited boron layer.

Furthermore, it is known that in order for boron to crystallize, it is necessary to keep it at a high temperature during a period t, said period t decreasing with the temperature. However, it has been observed that with temperatures lying in the range 1050° C. to 1250° C., when the fiber runs through the reactor in which boron is deposited at a speed not less than 100 m/min (which corresponds to a conventional speed for fiber-drawing), the time during which the boron coated fiber remains in the reactor is less than t, such that, at said temperatures, a layer of boron is deposited which is non-crystallized, i.e. amorphous.

The growth rate of the amorphous boron layer on the fiber may be at least 0.10 µm/s, and is preferably in the vicinity of about 0.25 µm/s. By imposing such a lower limit, by an appropriate selection of flow rates for the various reagents given the running speed of the fiber, the operating time during which amorphous boron is deposited is limited, thus limiting the reactivity between the boron and the silica and enabling satisfactory adherence and hardness to be achieved. Furthermore, a growth rate greater than 0.10 µm/s guarantees that the deposited boron does not have time to crystallize at the temperature of deposition reaction.

In the temperature range 1100° C. to 1200° C., an optimal result of the method of the invention is obtained.

In advantageous manner, the ratio R of the molar concentration of the boron chloride to that of the hydrogen lies in the range 1/20 to 1/4. In said range, it is possible to observe both that the deposited boron layer has particularly high Vickers hardness, in particular greater than 4700 kg/mm$^2$ (Vickers hardness increasing with R), and that the level of reactivity between the boron and the silica is low (the reactivity between the boron and the silica increasing with R), enabling interaction between the boron and the silica to be limited so as to obtain the above-mentioned thin interaction layer.

According to another characteristic of the present invention, the boron coating is applied in line with fiber-drawing, and the running speed of the fiber is not less than 100 m/min.

To obtain a boron layer which is amorphous, i.e. non-crystalline, it is necessary for the rate of renewal of the gaseous reagents $BCl_3$ and $H_2$ in the deposition reactor to be high. In the present invention, this is advantageously obtained by the fact that the fiber runs through said reactor at high speed, i.e. at a speed of not less than 100 m/min.

Furthermore, the pressure of the gaseous phase is advantageously in the vicinity of atmospheric pressure, which enables the boron protective coating to be applied in line with fiber-drawing.

Finally, according to a very advantageous characteristic of the invention, it is possible to add to the initial mix of gaseous reagents a gaseous reagent that is a precursor of silicon, such as $SiH_4$, $SiH_3Cl$, $SiH_2Cl_2$, $SiHCl_3$, or $SiCl_4$; said compounds being given in order of decreasing reactivity. Adding such compounds enables the amorphous boron layer to be doped with silicon, and thus enables a very hard deposited layer to be obtained. In addition, the presence of silicon compounds in the gaseous mix enables the initial interaction between the gaseous phase and the silica of the fiber to be limited and controlled. Adherence of the boron deposit to the fiber is thus optimal.

The present invention also provides an optical fiber comprising an optical core enclosed in optical cladding, both made of a silica-based material, and an amorphous boron-based protective coating deposited on said optical cladding, wherein said protective coating includes:

an intermediate layer in contact with said optical cladding and resulting from interaction between boron and silica; and an amorphous boron layer on top of said intermediate layer.

Additionally, the boron layer may be doped with silicon.

BRIEF DESCRIPTION OF THE DRAWING

Other characteristics and advantages of the present invention appear in the following description of a method of the invention, given by way of non-limiting example.

In the following figures.

In the figures, common elements have the same reference numbers.

MORE DETAILED DESCRIPTION

Initially it is recalled that amorphous boron is non-crystalline boron, characterized in particular by the absence of grain boundaries in its structure, giving it good sealing properties and high breaking strength. It therefore presents the same advantages as non-crystalline carbon concerning its sealing properties. However, it is much harder than non-crystalline carbon, thereby imparting improved abrasion resistance to the fiber, such that the thickness of the resin protective coating can be substantially reduced in comparison with such a protective layer made on the basis of carbon, and said resin coating may even be omitted.

It is recalled that non-crystalline structures are characterized by disorganization of the matter that constitutes them. A 1% content of crystallized grains corresponds to traces of crystallization which cannot be prevented from appearing, and which are therefore present by way of structural imperfections in the amorphous layer of boron, without significant consequences to the desired properties of the protective layer. With such a crystallized grain content, it can be said that the deposited boron is "essentially" non-crystalline, or amorphous.

Figure 1:
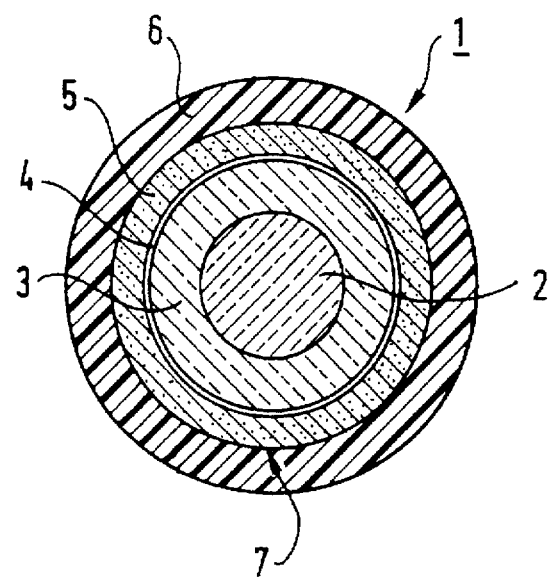
FIG. 1 is a cross-section view of an optical fiber of the invention provided with an amorphous boron-based protective coating.

FIG. 1 shows a fiber 1 of the invention including, disposed coaxially from the inside to the outside:

a silica-based optical core 2 for guiding the majority of the light waves;

optical cladding 3 which is also silica-based;

a very thin intermediate interaction layer 4 between the boron and the silica;

a layer 5 of amorphous boron; and an optional resin protective coating 6 of thickness less than 50 µm, and preferably in the vicinity of 10 µm.

The protective coating 7 of the fiber 1 of the invention comprises both the intermediate layer 4 and the layer 5. Its thickness lies in the range 10 nm to 200 nm, and is preferably in the vicinity of 100 nm.

As explained above, the layer 5 may be doped with silicon when the temperature selected for applying the coating 7 is such that doping is enhanced. In addition, by using a reagent that is a precursor of silicon during the method, doping of the layer 5 with silicon is enhanced.

Naturally, the core 2 and the optical cladding 3 can have a conventional simple structure, i.e. each having a single respective layer of constant refractive layer, or they may be of more complex structure, i.e. each constituted by a plurality of superposed layers, and each having a varying refractive index. Neither the structure of the core nor that of the optical cladding is described in greater detail since such structure is not part of the present invention. However, it will readily be understood that the invention can be applied to any known fiber structure.

The amorphous boron protective coating 7 imparts mechanical protection to the fiber, and enhanced abrasion resistance, enabling the fiber 1 to be used in optical cables of high capacity and that are highly compact. The thickness of the resin coating can be about half that required when a carbon protective coating is used, and can even be eliminated. The coating 7 further provides sealing properties comparable to those provided by a carbon coating.

A deposition method of the invention is now described with reference to FIG. 2, which is a diagram showing a machine 10 enabling the fiber 1 of FIG. 1 to be manufactured.

The machine 10 comprises, disposed one after another within a vertical fiber-drawing installation:

- a fiber-drawing oven 11 in which a fiber is drawn from preform 12 in well-known conventional manner, said preform having an optical core (not shown) identical in composition and greater in diameter than the core 2, enclosed in optical cladding (not shown) identical in composition and greater in thickness than the optical cladding 3, the ratio of the diameter of the optical cladding to the diameter of the optical core of the preform 12 being identical to the ratio of the diameter of the optical cladding 3 to the diameter of the optical core 2;
- a reactor 14 for applying the coating 7;
- control means 15 for controlling the diameter of the fiber leaving the reactor 14;
- optional resin coating means 16, for producing the resin coating 6 on the boron coating 7;
- a device 17 for polymerizing the resin coating 6 by ultraviolet radiation;
- control means 18 for controlling the final diameter of the resulting fiber 1; and
- a reel 19 for winding-in the finished fiber 1.

Only one reactor 14 has been shown for boron deposition. However, when necessary, boron deposition can be performed in a plurality of reactors disposed one after another along the fiber-drawing line.

According to the invention, in order to obtain the boron-based coating 7 on the bare optical fiber 13, gaseous boron chloride is reduced by gaseous hydrogen in application of the following equation:

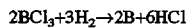

$$2BCl_3 + 3H_2 \rightarrow 2B + 6HCl$$

The boron coating is thus obtained chemically from the vapor phase.

According to the invention, it is essential to perform said reduction at a temperature lying in the range 1050° C. to 1250° C., and preferably in the range 1100° C. to 1200° C., for the reasons mentioned in detail above. Reduction takes place, for example, at 1150° C.

The pressure of the gaseous phase of the reagents is preferably in the vicinity of atmospheric pressure, particularly when deposition is performed in line with fiber-drawing, which enables an open reactor to be used with it being possible for the fiber to enter and to leave the reactor. The gaseous phase can be protected from the outside air simply by means of inlet and outlet gas-locks for the fiber (not shown), with an inert gas being caused to circulate in the gas-locks at a pressure slightly greater than atmospheric pressure.

In order to obtain a very hard boron coating 7, whilst avoiding a high level of interaction with the boron leading to boron oxide $B_2O_3$ being formed, the ratio R of the molar concentration of the boron chloride to that of the hydrogen is selected to lie in the range 1/20 to 1/4, e.g. equal to 1/4.

To obtain an amorphous boron layer 5, it is preferable for the transfer speed of the gaseous phase boron to the surface of the bare fiber 13 to be high. It is by applying the boron to the surface of the fiber at said high speed which ensures that a layer of boron is formed that is essentially non-crystalline. Said high speed can be achieved by rapid renewal of the reagents at the surface of the fiber. The rapid renewal of the reagents at the surface of the fiber, which is accompanied by a rapid evacuation of gaseous products from the deposition reaction, i.e. hydrochloric acid HCl when the reagents are $BCl_3$ and $H_2$, is achieved both because the fiber runs at high speed through the reactor 14, and because the gaseous phase is renewed by the flows of gas between the inlet and the outlet of the reactor 14. Thus the running speed of the fiber in the reactor is preferably not less than 100 m/min, which corresponds to a conventional speed for fiber-drawing; consequently, manufacture of the optical fiber is not slowed down by applying the amorphous boron coating in line with fiber-drawing.

With a running speed for the fiber 13 through the reactor 14 of 200 m/min, it is possible to deposit a boron coating 7 of thickness approximately equal to 75 nm in 0.3 s, using a boron coating growth rate of 0.25 μm/s. (Such a growth rate can be obtained by choosing a boron chloride flow rate of 0.5 l/min and a hydrogen flow rate of 5 l/min).

A reagent that is a precursor of silicon, such as $SiH_4$, $SiH_3Cl$, $SiH_2Cl_2$, $SiHCl_3$, or $SiCl_4$, can advantageously be added to the gaseous phase.

Figure 2:
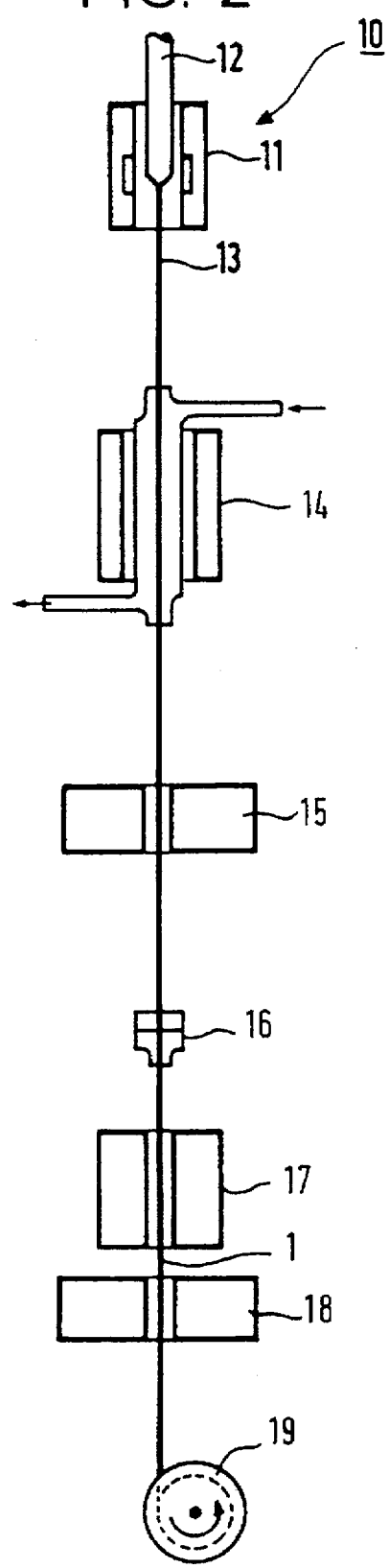
FIG. 2 is a simplified diagram of a fiber-drawing machine including a boron deposition reactor for implementing the method of the invention.

The machine 10 described in relation to FIG. 2 is a conventional fiber-drawing machine, to which a deposition reactor 14 for depositing the boron coating 7 has been added. Certain elements of the machine 10 are optional, such as the diameter control means 15 and 18.

Furthermore, the resin coating means may be of any type, and the resin coating need not be performed in the line.

Naturally, the present invention is not limited to the above-described embodiment.

In particular, the numerical values given for the characteristics of the boron layer and for the method of depositing said layer are by way of indication only.

In addition, an optical fiber of the invention may comprise, on top of the boron layer, other layers in addition to the resin coating, such as colored identification coatings in particular.

Finally, any means can be replaced by equivalent means without going beyond the ambit of the invention.

We claim:

1. A method of applying an amorphous boron-based protective coating to an optical fiber comprising an optical core enclosed in optical cladding, both made of a silica-based material, said method comprising:

applying an amorphous boron to the surface of said optical fiber chemically from the vapor phase at a temperature lying in the range 1050° C. to 1250° C., by reducing boron chloride $BCl_3$ by means of hydrogen $H_2$.

2. A method according to claim 1, wherein, when boron is applied, it forms on said optical cladding:

an intermediate layer in contact with said optical cladding and resulting from interaction between boron and silica; and an amorphous boron layer on top of said intermediate layer.

3. A method according to claim 1, wherein the temperature lies in the range 1100° C. to 1200° C.

4. A method according to claim 1, wherein the ratio of the molar concentration of boron chloride to that of hydrogen lies in the range 1/20 to 1/4.

5. A method according to claim 1, wherein the pressure of the gaseous phase is in the vicinity of atmospheric pressure.

6. A method according to claim 1, wherein said amorphous boron-based coating is applied in line with fiber-drawing said optical fiber, the running speed of said fiber being not less than 100 m/min during said deposition.

7. A method according to claim 1, wherein the growth rate of said amorphous boron-based coating on the surface of said fiber is not less than 0.10 µm/s.

8. A method according to claim 1, further comprising the step of adding a gaseous precursor of silicon chosen from $Si_4$, $SiH_3Cl$, $SiH_2Cl_2$, $SiHCl_3$, and $SiCl_4$, to the initial mix of reagents.

9. A method according to claim 1, wherein the thickness of said boron coating lies in the range 10 nm to 200 nm, and is preferably about 100 nm.

10. An optical fiber comprising an optical core enclosed in optical cladding, both made of a silica-based material, and an amorphous boron-based protective coating deposited on said optical cladding, wherein said protective coating includes:

an intermediate layer in contact with said optical cladding resulting from interaction between boron and silica; and an amorphous boron layer on top of said intermediate layer.

11. An optical fiber according to claim 10, wherein said boron layer is doped with silicon.

* * * * *